United States Patent [19]
Maruko

[11] 4,373,996
[45] Feb. 15, 1983

[54] APPARATUS FOR PRODUCING FRESH WATER FROM SEA WATER

[76] Inventor: Saburo Maruko, 430-3 Kamiwada, Yamato-Shi, Kanagawa-Ken, Japan

[21] Appl. No.: 240,597

[22] Filed: Mar. 4, 1981

[30] Foreign Application Priority Data

Mar. 4, 1980 [JP] Japan .................................. 55-26104

[51] Int. Cl.³ ............................ C02F 1/06; C02F 1/14
[52] U.S. Cl. ..................................... 202/173; 202/174; 202/176; 202/177; 202/235; 126/424; 126/435; 126/438; 203/11; 203/22; 203/25; 203/100; 203/DIG. 1; 203/DIG. 16; 203/88
[58] Field of Search ............... 202/176, 177, 173, 174, 202/234, 235, 177, 205, 180, 166; 203/DIG. 1, 11, 22, 25, 100, DIG. 17, DIG. 16, 88; 159/15; 126/435, 438, 424

[56] References Cited

U.S. PATENT DOCUMENTS

| | | | |
|---|---|---|---|
| 2,490,659 | 12/1949 | Snyder | 202/174 |
| 2,716,446 | 8/1955 | Ross | 202/205 X |
| 3,394,054 | 7/1968 | Hoham | 202/234 |
| 4,053,368 | 10/1977 | Claude et al. | 203/DIG. 1 |
| 4,121,977 | 10/1978 | Carson | 203/DIG. 1 |
| 4,172,766 | 10/1979 | Laing et al. | 203/DIG. 1 |
| 4,270,981 | 6/1981 | Stark | 203/DIG. 1 |
| 4,273,102 | 6/1981 | Anthony | 126/435 |
| 4,285,389 | 8/1981 | Horton | 126/435 |
| 4,312,709 | 1/1982 | Stark et al. | 203/DIG. 1 |
| 4,317,444 | 3/1982 | Maruko | 126/438 |

*Primary Examiner*—Wilbur L. Bascomb, Jr.
*Attorney, Agent, or Firm*—Armstrong, Nikaido, Marmelstein & Kubovcik

[57] ABSTRACT

An apparatus for producing fresh water from sea water in which a vertical accumulator utilizes the sensible heat of sea water so as to evaporate said sea water to a temperature above 100° C. under pressure, a heat-exchanger connecting between the upper and lower portions of said accumulator causes a high temperature liquid to effect heat-exchange with sea water to be evaporated, a fresh sea water feed line connected to the lower portion of said accumulator adjusts the pressure within the accumulator and an evaporator receives higher temperature sea water. The accumulator accumulates heat in such a manner that the upper portion of said accumulator holds higher temperature sea water and the lower portion of the accumulator holds lower temperature sea water so that when heat is accumulated, the amount of said higher temperature sea water increases and when heat is radiated, the amount of higher temperature decreases whereby sea water evaporates at all times.

3 Claims, 6 Drawing Figures

4,373,996

APPARATUS FOR PRODUCING FRESH WATER FROM SEA WATER

BACKGROUND OF THE INVENTION

This invention relates to an apparatus for continuously producing fresh water from sea water at less expense day and night through the utilization of solar heat.

There have been proposed and practically employed a variety of apparatus for producing fresh water from sea water. The prior art apparatus are generally classified into the multi-stage flash type, multi-effect evaporator type and electrodialysis type. Any one of the prior art apparatus is required to consume expensive energy. Until the present invention, any high efficiency apparatus for producing fresh water from sea water through the utilization of less expensive energy source such as solar heat has not been developed. And since the sun emits heat energy only during the period of time from sunrise to sunset and the energy amount obtainable from the sun tends to be reduced when the sun is covered with clouds, it is very difficult to continuously produce fresh water from sea water through the utilization of solar heat by the prior art apparatus.

In order to solve the above-mentioned problem, I have exerted myself to develop an apparatus for producing fresh water from sea water and have found that if such an apparatus is provided with an accumulator which utilizes the sensible heat of sea water to evaporate the water at a temperature above 100° C. under pressure, fresh water can be produced from sea water day and night.

SUMMARY OF THE INVENTION

According to the present invention, there is provided an apparatus for producing fresh water from sea water which comprises a vertical accumulator adapted to utilize the sensible heat of sea water to evaporate the water at a temperature above 100° C. under pressure, a heat-exchanger provided in a line connecting between the upper and lower portions of the accumulator for causing an elevated temperature liquid obtained from a solar heat collector to effect heat-exchange with sea water to be evaporated and a fresh sea water feed line connected to the bottom of said accumulator to adjust the pressure within the accumulator so that the upper portion of the accumulator holds higher temperature sea water and the lower portion of the accumulator holds lower temperature sea water, said accumulator accumulating heat so that when heat is accumulated the amount of said higher temperature sea water increases and when heat is radiated, the amount of higher temperature sea water decreases whereby sea water evaporates at all times.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

PREFERRED EMBODIMENTS OF THE INVENTION

Figure 1:
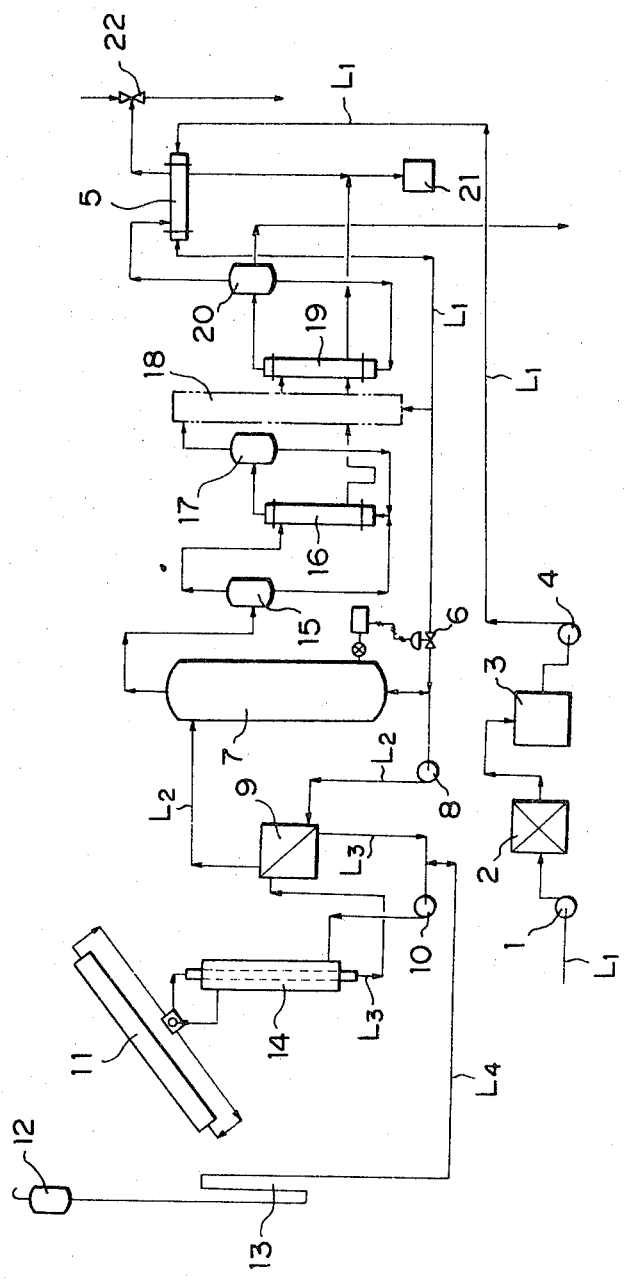
FIG. 1 is a diagram of one preferred embodiment of the apparatus for producing fresh water from sea water constructed in accordance with the present invention.

The present invention will be now described referring to the accompanying drawings and more particularly, to FIG. 1 thereof in which the first or preferred embodiment of the apparatus for producing fresh water from sea water constructed in accordance with the principle of the present invention is shown.

The embodiment of FIG. 1 is operated on the multi-effect evaporator principle in which heat medium obtained from a solar heat collector is caused to effect heat-exchange with sea water to be evaporated and the sensible heat of the sea water under a relatively low pressure and at a temperature below the boiling point thereof and corresponding to accumulator pressure is utilized.

A sea water feed line $L_1$ is in communication at one end with a sea water source such as the sea and at a point adjacent to the other end with the bottom of an accumulator 7. Provided in the sea water feed line $L_1$ are a fresh sea water pump 1, a sea water filter 2, a filtrate reservoir 3, a pump 4, a condenser 5 associated with a final stage evaporator and a pressure regulator 6 as seen from the upstream. Thus, sea water from the sea water source is pumped by the pump 1 to the filter 2 where the sea water is filtered and the filtered sea water then flows into the filtrate or filtered sea water reservoir 3 from which the sea water is fed under pressure by the pump 4 to the condenser 5 associated with the final stage evaporator and in the condenser 5, the sea water is caused to effect heat-exchange with vapor present in the condenser. After the heat-exchange, the sea water flows through the pressure regulation valve 6 which adjusts the pressure of the sea water to a predetermined pressure and then flows into the accumulator 7 at the bottom of the accumulator 7 so as to maintain a constant pressure within the accumulator.

The sea water feed line $L_1$ leads to a pump 8 from which a recycle line $L_2$ leads to the upper portion of the accumulator 7 and provided in the recycle line $L_2$ between the pump 8 and the upper portion of the accumulator 7 is a heat-exchanger 9. Connected to the heat-exchanger 9 is a second recycle line $L_3$ which leads to a solar heat collector 11. Provided in the second recycle line $L_3$ are a pump 10 and a heat-exchanger 14 between the collector 11 and pump 10.

When the sun shines, the pump 8 is operated to pump the sea water introduced into the feed line $L_1$ and the sea water present in the lower portion of the accumulator 7 to the heat-exchanger 9 where the two sea waters are caused to effect heat-exchange with heat medium at an elevated temperature and the resulting water then flows into the upper portion of the accumulator 7. When the sun does not shine, with the pump 8 maintained in its inoperative position, the sea water supplied from the external sea water source into the feed line $L_1$ is allowed to flow through the line $L_1$ into the lower portion of the accumulator 7 while heat medium is pumped by the pump 10 into the solar heat collector 11 where the temperature of the heat medium is raised and the elevated temperature heat medium then flows into the heat-exchanger 9 to effect heat-exchange with the sea water in the heat-exchanger. After the heat-exchange, the heat medium is recycled to the solar heat collector 11. Since the heat medium is raised its temperature in the solar heat collector 11, an expansion tank 12 is preferably connected to a heat medium recycle line $L_4$ through a U-seal 13. The heat medium recycle line $L_4$ is preferably provided with a heat-exchanger 14 so that the heat medium at an elevated temperature from the solar heat collector 10 is caused to effect heat-exchange with the heat medium to be recycled from the heat-exchanger 9 to the solar heat collector 11.

Assuming that solar energy or heat is available from the very time of sunrise, the pump 10 is operated to pump the heat medium to the solar heat collector 11 to be raised its temperature. However, in such a case, the amount of heat medium to be pumped to the solar heat collector 11 is adjusted by a valve (not shown) in conformity with the amount of available solar heat so that the heat medium maintained at a constant temperature and the supply amount of sea water to be caused to effect heat-exchange with the heat medium is also adjusted by a valve (not shown) so that the sea water is maintained at a constant temperature. Thus, the heat-exchanger 9 is of a one-pass type and the outlet temperature of the heat-exchanger 9 is maintained at a low temperature as much as possible.

The accumulator 7 is preferably a vertically elongated cylindrical tank and always fully filled with liquid having sea water at a substantially boiling point temperature corresponding to the pressure within the accumulator 7 contained in the upper portion thereof.

The device adapted to evaporate the sea water at the substantially boiling point temperature present within the upper portion of the accumulator 7 and produce fresh water from the sea water may be a conventional multi-effect evaporator system. The mechanism for evaporating sea water by the multi-effect evaporator system will be now described. When the sea water at the substantially boiling point temperature is supplied from the upper portion of the accumulator 7 to a first stage evaporation chamber 15, the temperature of the sea water is reduced to its boiling point corresponding to the pressure within the accumulator 7 in the evaporation chamber 15 because the first evaporation chamber 15 is maintained at a pressure below the pressure of the accumulator 7 and the sea water is evaporated in an amount corresponding to the difference between the enthalpy of the fresh sea water and that of the sea water at the boiling point temperature within the first stage evaporation chamber 15. The generated vapor flows into the outer cylindrical portion of a double-walled heater 16 associated with a second stage evaporator to be raised its temperature and the vapor at the elevated temperature then flows into a second stage evaporation chamber 17 to heat the sea water within the evaporation chamber 17. The same procedure is repeated in the succeeding stages including the last stage to evaporate the sea water by piecemeal in the succeeding stage evaporation chambers at stepwise reduced pressure stage after stage and the vapor generated in the preceding stage evaporation chamber flows into the heater associated with the next following stage evaporator to effect heat-exchange with the sea water in the heater to be condensed. The vapor generated in the last stage evaporation chamber 20 flows into the condenser 5 in which the vapor effects heat-exchange with the sea water freshly supplied to the apparatus of the present invention to be condensed therein. Reference numeral 18 schematically denotes the heaters and evaporation chambers associated with the intermediate stage evaporators. Reference numeral 19 denotes a heater associated with the last stage evaporator. The sea water condensed in each stage is collected into a fresh water reservoir 21. The multi-effect evaporator system is maintained under vacuum condition by a vacuum generator 22.

The reason for which sea water is caused to effect heat-exchange with heat medium instead of being directly fed to the solar heat collector is that if the sea water is heated to a high temperature on the order of 200° C., it is required to increase the pressure in the system to a value above 15.8 atmospheric pressure and thus, there are problems with respect to the resistance of the slidably seal and heat collector tube of the solar heat tube against pressure and the solution of such problems increases the production cost of the solar heat collector.

Therefore, the solar heat collector 11 is supplied with a heat medium such as monopropyl naphthalene having a high boiling point under atmospheric pressure. When such a heat medium is employed, the heat medium can be heated to a temperature within the range of 200°–220° C. without applying any excessive load to the solar heat collector and sea water under pressure can be easily heated to a temperature above 100° C. through heat-exchange with the heat medium. And among the various components of the apparatus, only the accumulator 7 and the lines associated with the accumulator are required to have a construction having resistance against pressure and thus, the apparatus can be economically manufactured.

The accumulator 7 is always filled with liquid and the upper portion of the accumulator holds sea water at a higher temperature approximate to its boiling point corresponding to the pressure within the accumulator while the lower portion of the accumulator holds sea water at a lower temperature. However, when a certain amount of the higher temperature sea water flows out of the accumulator upper portion into the first stage evaporation chamber 15, lower temperature sea water in the same amount as that of the higher temperature sea water which has flowed out of the upper portion is supplied into the accumulator lower portion to define an interface between the higher and lower temperature sea waters. Although a sharp temperature gradation is present adjacent to the interface, the sea water in the upper portion and that in the lower half are prevented from mingling with each other. When solar energy is available from the very time of sunrise, the interface which has moved to a substantially high position within the accumulator 7 descends gradually whereby the amount of the higher temperature sea water increases correspondingly. And when the heat medium holding capacity of the solar heat collector 11 is designed to be equal to the quantity of heat required for evaporation of sea water so that the interface comes down to a substantially lowermost position within the accumulator 7, the capacity of the accumulator 7 is determined depending upon the amount of heat necessary for evaporation of sea water at night with the sensible heat of sea water to be evaporated.

Assuming that the amount of sea water to be recycled is 1 when the sun shines, the amount of higher temperature sea water which flows out of the accumulator 7 is 0.5 and that of lower temperature sea water is also 1.5 whereby the amount of sea water equivalent to 0.5 becomes to have a higher temperature and the volume of the higher temperature zone of the accumulator increases to move the interface between the higher and lower temperature sea waters downwardly.

The accumulator 7 has a diameter substantially greater than that of the recycle line $L_2$ and there is neither sea water turbulent flow nor sea water counterflow within the accumulator 7 and only heat transfer occurs through the heat conductivity of sea water (from the higher temperature sea water to the lower temperature sea water) to define the interface between the higher and lower temperature sea waters. In order to design the accumulator 7 in such a way, it is necessary to supply the sea water from the source through the feed line $L_1$ into the accumulator 7 at the bottom of the accumulator 7.

The condensation ratio of sea water to be evaporated or the inlet sea water amount to the outlet sea water amount ratio is determined depending upon the temperature in the upper portion of the accumulator 7 and the number of the stages in the multi-effect evaporation system, but in order to increase heat effect, the condensation ratio inevitably exceeds the critical range of 1.35–1.37 within which no scale is formed and in order not to exceed the critical condensation ratio, the condensation ratio is adjusted by introducing a partially pre-heated sea water into a stage adjacent to the final stage (any one of the intermediate stages 18 in the embodiment of FIG. 1).

Figure 2:
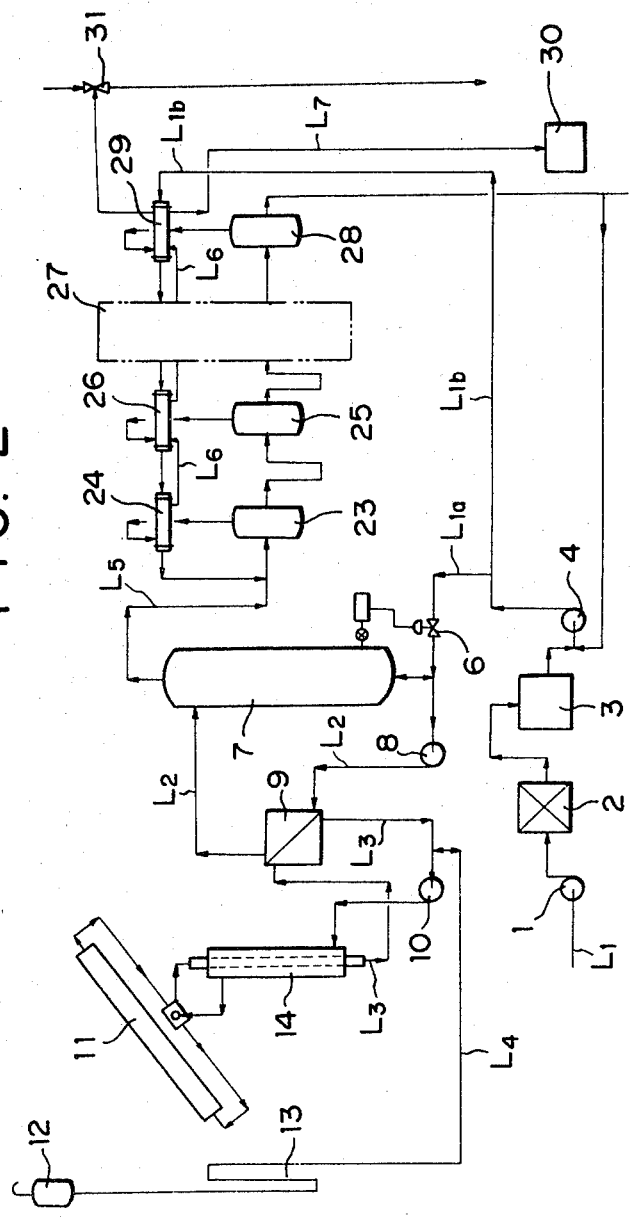
FIG. 2 is a diagram of another embodiment of the apparatus for producing fresh water from sea water constructed in accordance with the present invention.
Figure 3:
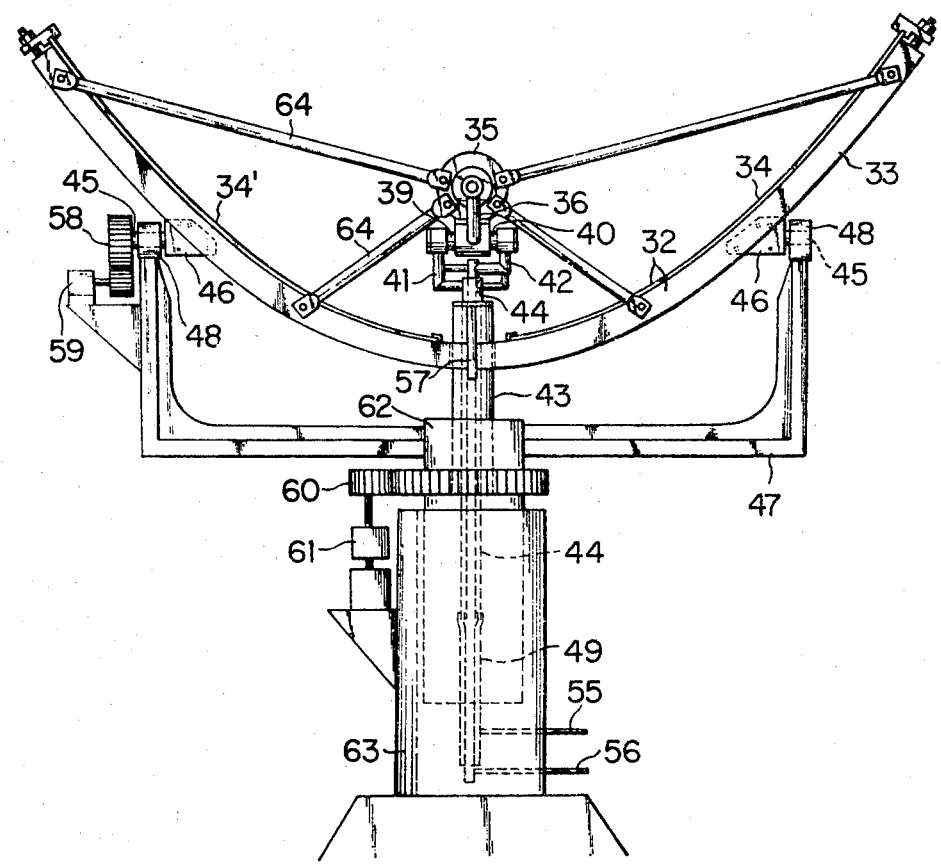
FIG. 3 is a schematic side elevational view of a solar heat utilization apparatus with which the apparatus of the present invention is used.
Figure 4:
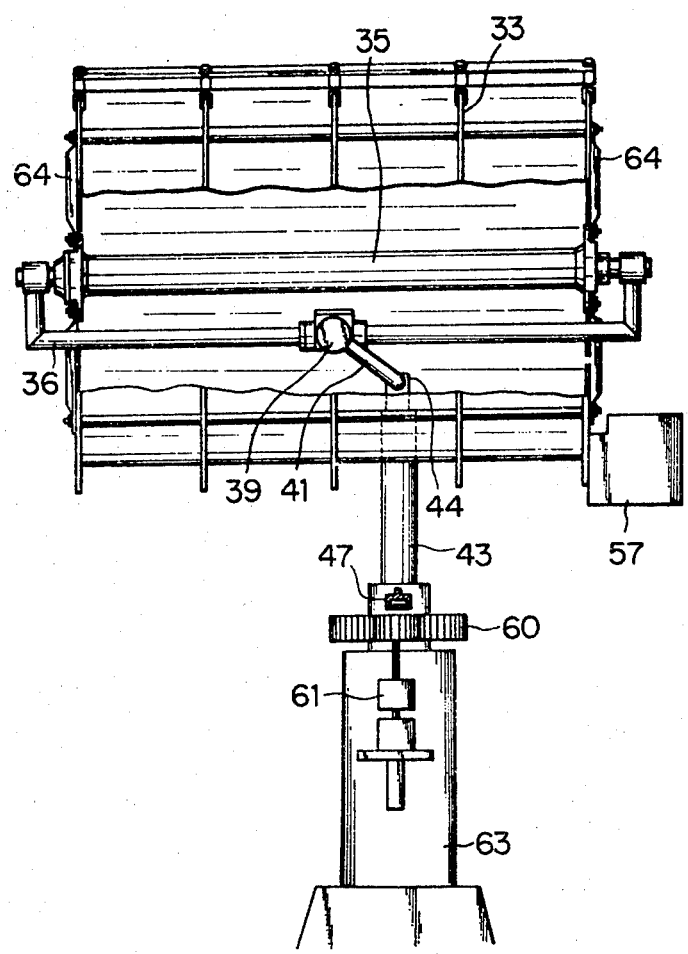
FIG. 4 is a front elevational view of said solar heat utilization apparatus as shown in FIG. 3.
Figure 5:
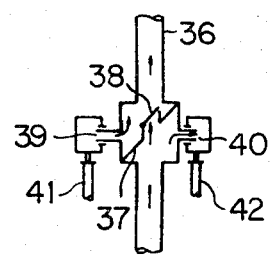
FIG. 5 is a fragmentary schematic elevational view of the mechanism for prevention of cold liquid discharge of the solar heat utilization apparatus as shown in FIGS. 3 and 4.
Figure 6:
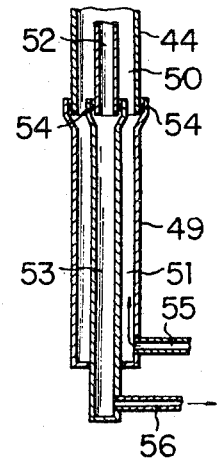
FIG. 6 is a fragmentary schematic view showing the relationship between the dual rotary shaft and the dual stationary shaft of said solar heat utilization apparatus as shown in FIGS. 3 and 4.

The embodiment of FIG. 2 is designed to operate the accumulator 7 at a relatively high temperature (about 200° C.) by a multi-stage flash system. Since the mechanism incorporating the accumulator 7 therein is similar to that as described hereinabove, only the mechanism for evaporating sea water will be now described referring to FIG. 2.

The sea water feed line $L_1$ is branched downstream of the pump 4 into a first branch line $L_{1a}$ and a second branch line $L_{1b}$. The first branch line $L_{1a}$ connects to the bottom of the accumulator 7 and has a pressure regulating valve 6 interposed between the pump 4 and accumulator 7. The first branch line $L_{1a}$ is also connected at the other end to a recycle line $L_2$ which is in turn connected to the upper portion of the accumulator 7. The second branch line $L_{1b}$ extends through a last stage condenser 29, a second stage condenser 26 and a second stage condenser 24 and connects to a line $L_5$ which feeds sea water from the upper portion of the accumulator 7 to a second flash tank 23. Thus, a portion of sea water under pressure pumped by the pump 4 is passed through the valve 6 and then sub-divided into two flows one of which flows into the accumulator 7 and the other of which flows into the recycle line $L_2$. The rest of the sea water under pressure passes through the last stage condenser 29 associated with a last stage flash tank 28 and effects heat-exchange with vapor generated in the flash tank 28 and is then supplied to the condenser 29. Thereafter, the sea water under pressure in succession passes through the condensers associated with intermediate stage flash tanks, the second stage condenser 26 associated with a second stage flash tank 25 and the first stage condenser 24 associated with the first stage flush tank 23. Each time the sea water under pressure passes through the successive stage condensers, the sea water effects heat-exchange with the vapor in the condensers to increase its temperature step by step. After having passed through the first stage condenser 24, the now high temperature sea water flows into the recycle line $L_5$ where the sea water mingles with the high temperature sea water from the upper portion of the accumulator 7 and the resulting sea water then flows into the first stage flash tank 23. Reference numeral 27 schematically denotes the intermediate stage flash tanks and associated condensers.

The vapor generated in the first stage flash tank 23 is supplied to the first stage condenser 24 in which the vapor effects heat-exchange with the sea water. Similarly, the vapor generated in each of the successive stage flash tanks is supplied to the condenser associated with the respective tank to effect heat-exchange with the sea water in the condenser and the condensed sea water obtained in each of the condensers in succession passes through the respectively succeeding condenser by way of a line $L_6$ connecting between the adjacent condensers to the last stage condenser 29 from which the condensed sea water passes through a line 7 to a condensed water reservoir 30 where the condensed water is accumulated and the sea water from the last stage flash tank 28 discharges out of the system.

In the embodiment of FIG. 2, the condensation ratio of sea water is determined depending upon the temperature of sea water to be supplied to the first stage, but in order that the sea water processing operation is carried out in one pass mode so as to maintain the condensation ratio within the range of 1.35–1.37 in which no problem such as scale occurs, the temperature within the first stage flash tank 23 rises to an excessively high value which applies a prohibitive load to the apparatus for producing fresh water from sea water by the utilization of solar heat. Thus, according to the present invention, a portion of the condensed sea water discharged out of the system is introduced into the fresh sea water feed line $L_1$ to mingle with the fresh sea water supplied from the sea water source to the feed line $L_1$ and the resulting sea water is recycled within the system to adjust the condensation ratio of the sea water. Such arrangement is economically advantageous in the fact that a small capacity heat-exchanger (not shown) can be used for recovering the sensible heat of the condensed sea water to be discharged out of the system or such a heat-exchanger can be eliminated. In FIG. 2, reference numeral 31 denotes a vacuum generator.

The solar heat collector with which the apparatus of the present invention is used is not exclusively limited to a specific device provided that the collector can heat heat medium to a high temperature. For example, the solar heat collector employed in the solar heat utilization apparatus as disclosed in my co-pending U.S. Ser. No. 119,882 now U.S. Pat. No. 4,317,444 and the sun following-up device for solar heat utilization apparatus as disclosed in my co-pending U.S. Ser. No. 219,120, are most suitably employed. The former is an apparatus adapted to focus sunlight so as to utilize the solar heat and the latter is adapted to cause the sunlight reflector to follow up the sun.

The solar heat utilization apparatus of the above-mentioned U.S. patent application will be now described referring to FIGS. 3 through 6 in which the solar heat collector is schematically shown. The sunlight reflector 32 generally comprises a grid structure framework 32 curved so as to define a parabolic trough and metal plates 34, 34' secured to the framework so as to form the mirror face of the reflector. A heat collecting means 35 is provided at the focus of the parabolic trough of the reflector 32. Connected to the heat collecting means 35 is a liquid circulating pipe 36 and liquid to be heated flows from the pipe 36 into the heat collecting means 35 in which the liquid is heated with the heat from the sunlight by absorbing the sunlight therein and the heated liquid then flows back into the circulating pipe 36. The circulating pipe 36 is provided in an intermediate section between the opposite ends thereof with a mechanism for prevention of cold liquid discharge (see FIG. 5) and the mechanism includes a partition plate 37 in the center portion thereof and horizontal inlet and outlet pipes 39, 40 are connected to the opposite sides of the circulating pipe 36. The inlet tube has a liquid supply tube 41 connected thereto and the outlet pipe 40 has a discharge tube 42 connected thereto. The liquid supply tube 41 and discharge tube 42 are connected to a common rotary double tube 44 which is in turn disposed coaxially within a hollow vertical rotary shaft 43 for rotation together with the latter.

A pair of opposite shaft support members 46 are provided in diametrically opposite positions of the framework 33 of the sunlight reflector to support the inner ends of a pair of horizontal stub shafts 45 and the other or outer ends of the stub shafts are journalled in bearings 48 which are in turn suitably supported by the free ends of the opposite legs of a frame member 47 secured to the vertical rotary shaft 28. The horizontal rotary stub shafts 45 are disposed coaxial or substantially coaxial with the liquid inlet and outlet tubes 39, 40.

The rotary double tube 44 is connected at the lower end to a double stationary shaft 39 which is also in the form of a double tube. The outer tube 50 of the double tube 44 is in communication with the outer tube 51 of the stationary shaft 49 to form a supply passage for liquid to be heated. The inner tube 52 of the rotary double tube 44 is in communication with the inner tube 53 of the stationary shaft 49 to form a discharge passage for the liquid after the liquid has been heated. In the illustrated solar heat utilization apparatus, the sealing between the outer and inner tubes of the rotary tube 44 and stationary shaft 49, respectively, is not required to closely tight, but may be just sufficient to prevent leakage of the liquid to the exterior of the system. In the example as shown in the drawings, O-rings 54 are employed to seal the rotary tube 44 and stationary shaft 49.

The outer tube of the stationary shaft 49 is connected at the lower end to a supply tube 55 and the inner tube of the stationary shaft is connected at the lower end to a discharge tube 56 for heated liquid, respectively. The liquid from the supply tube 55 associated with the stationary shaft 34 passes through the supply passage defined by the outer tubes of the stationary shaft 49 and rotary tube 44 to and through the supply tube 41 of the circulating pipe 36 connected to the outer tube 50 of the double tube 44. The heated liquid discharged from the pipe 36 flows through the discharge tube 42 into the discharge passage defined by the inner tubes of the rotary tube 44 and stationary shaft 49 and then into the discharge tube 56 of the stationary shaft 49 to be discharged out of the system.

A rudder 57 is attached to the framework of the sunlight reflector and a gear 58 is mounted at the outer end of one of the horizontal rotary shafts which is operatively connected to a drive means such as a motor for driving the particular stub shaft. Reference numeral 60 denotes a gear for the vertical rotary shaft, reference numeral 61 denotes a drive means for the vertical rotary shaft, reference numeral 62 denotes a pipe for the vertical rotary shaft, reference numeral 63 denotes a pillow block for the vertical rotary shaft and reference numeral 64 denotes a support rod.

While only one embodiment of the invention has been shown and described, it will be understood that the same is for illustration purpose only and not to be taken as a definition of the invention, reference being had for this purpose to the appended claims.

What is claimed is:

1. An apparatus for producing fresh water from sea water comprising:

a solar heat collector having an inlet and an outlet, closed loop conduit means interconnecting said inlet and outlet of said collector for passing therethrough a high temperature liquid, a first pump in said closed loop conduit means, a heat exchanger having first and second inlets and first and second outlets, said first inlet and first outlet being connected to said closed loop conduit means for passing said high temperature liquid through one side of said exchanger, a vertical accumulator having a bottom, a lower portion, an upper portion, and a top, a first sea water feed line connected to said bottom of said accumulator, a pressure regulator in said first sea water feed line upstream of said bottom for regulating the pressure in said accumulator to a predetermined pressure above atmospheric pressure, a second sea water line connected from said first sea water feed line adjacent said bottom to said second inlet of said exchanger, a second pump in said second sea water line, means for shutting down said second pump when the sun is not shining, a third sea water line from said second outlet of said exchanger to said upper portion of said accumulator, an evaporator, and a fourth sea water line from said top of said accumulator to said evaporator, said upper portion of said accumulator receiving higher temperature sea water from said exchanger when said second pump is operating, said lower portion holding lower temperature sea water, whereby when the sun is shining, a proportion of higher temperature sea water in said accumulator increases displacing the lower temperature sea water therein out of said bottom and when the sun is not shining, higher temperature sea water is fed from the upper portion of the accumulator to said evaporator by being pushed out by said lower temperature sea water coming in said bottom so that said evaporator is constantly supplied with higher temperature sea water regardless of whether the sun is shining or not.

2. The apparatus for producing fresh water from sea water as set forth in claim 1, in which said evaporator is a multi-effect evaporator.

3. The apparatus for producing fresh water from sea water as set forth in claim 1, in which said evaporator is a multi-stage flash evaporator.

* * * * *